Aug. 8, 1967

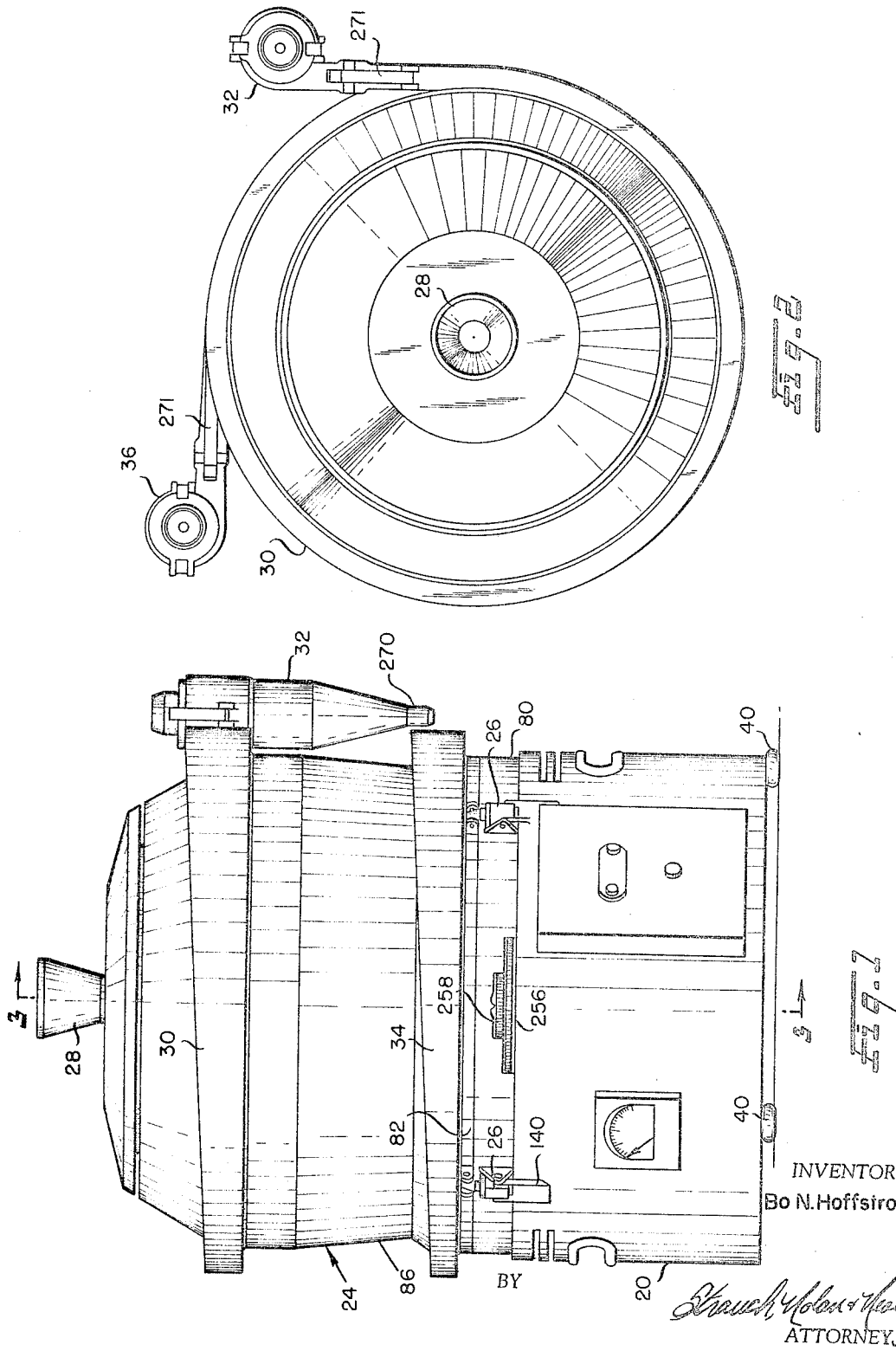

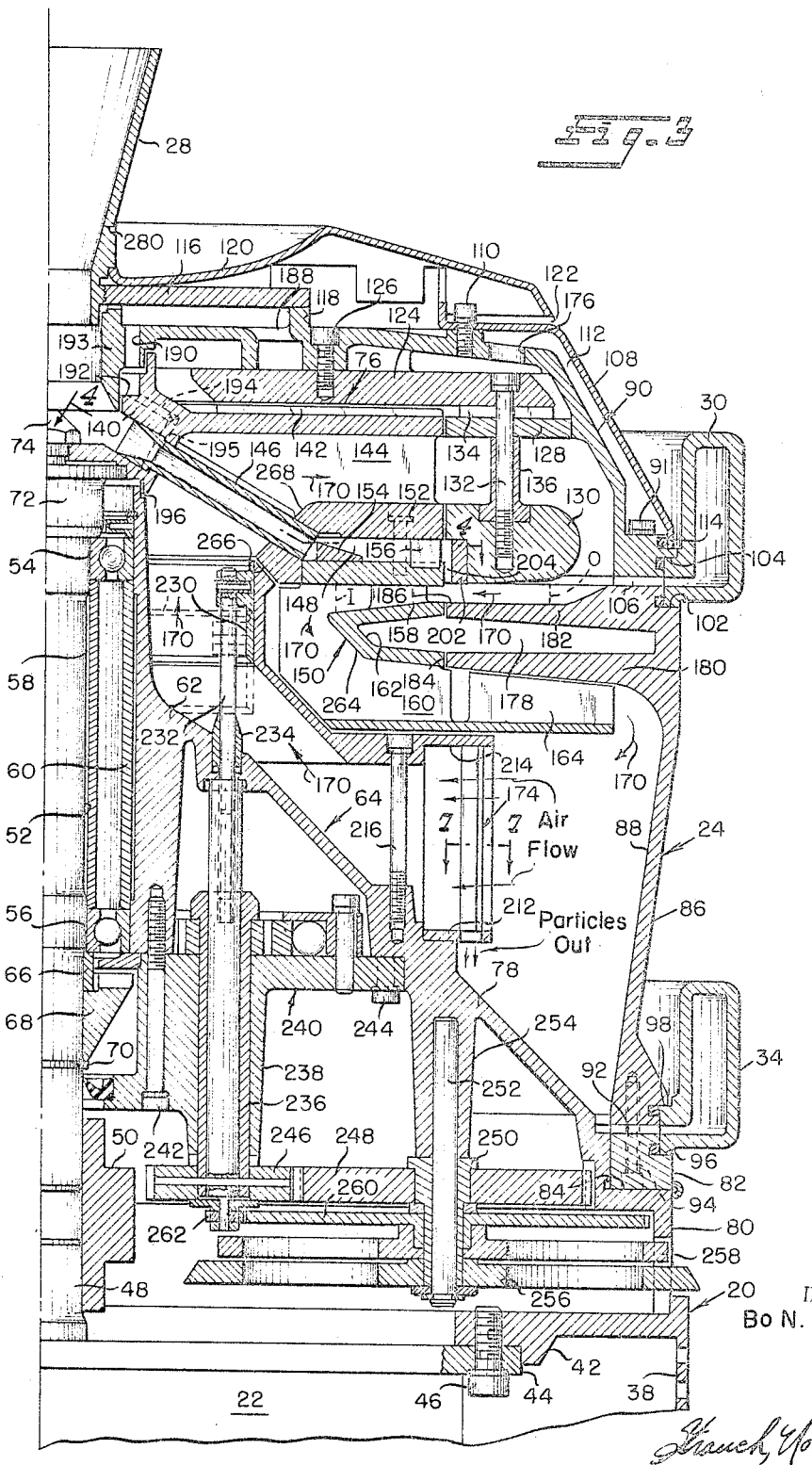

B. N. HOFFSTROM 3,334,741

ROTARY FLOW CLASSIFIER

Original Filed June 1, 1962

INVENTOR
Bo N. Hoffstrom

BY Strauch, Nolan & Neale

ATTORNEYS

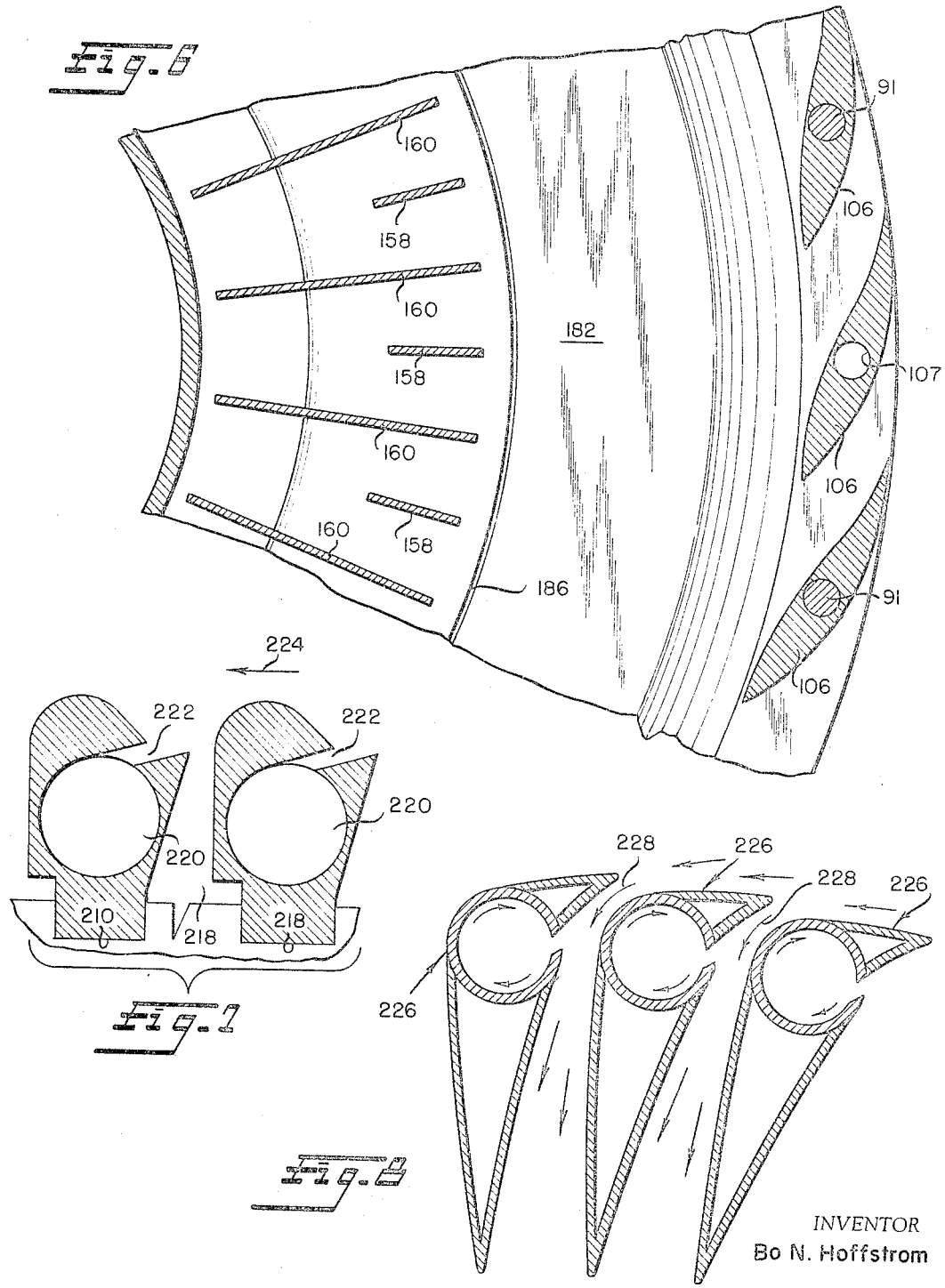

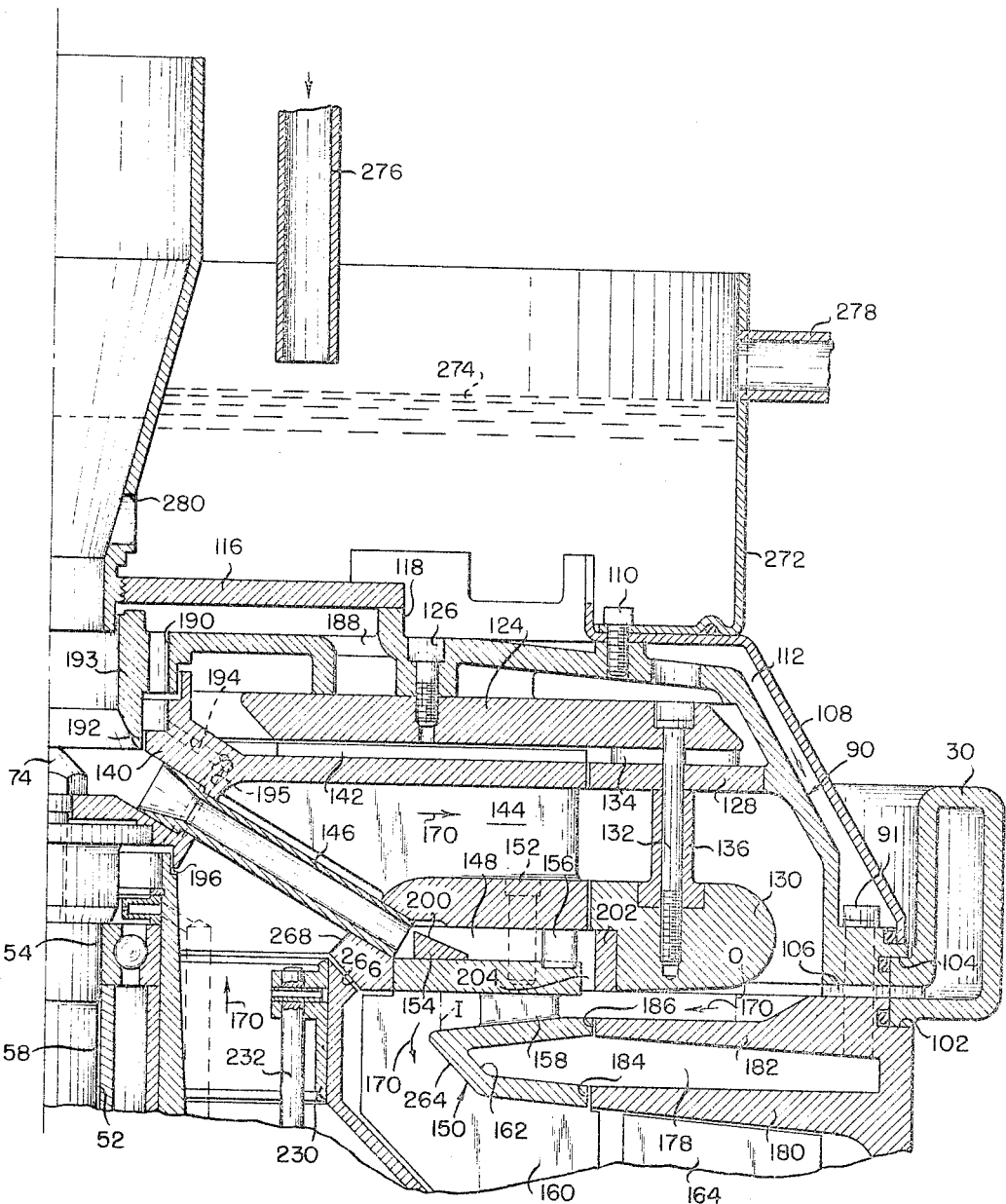

United States Patent Office

3,334,741
Patented Aug. 8, 1967

---

3,334,741
ROTARY FLOW CLASSIFIER
Bo N. Hoffstrom, Santa Monica, Calif., assignor to Douglas Aircraft Company, Inc., Santa Monica, Calif.
Continuation of application Ser. No. 199,514, June 1, 1962. This application May 10, 1966, Ser. No. 549,134
16 Claims. (Cl. 209—144)

This application is a continuation of application Ser. No. 199,514, filed June 1, 1962, and now abandoned.

The present invention relates to classifiers and more particularly to classifiers of the rotary type in which the particles to be classified are subjected to counteracting mass and drag forces.

The efficiency, economy and repeatability of many industrial processes depends upon the availability of particles classified within narrow limits in predetermined size ranges.

Since sieving and similar mechanical classification processes are limited as a practical matter to the classification of particles over 250 microns in size, most modern classifiers effect classification of the particles by subjecting the particles to opposing mass forces and drag forces. Since mass force varies as particle volume, i.e. as particle dimension cubed while drag force varies as frontal area, that is as particle dimension squared, larger particles can be made to move against the flowing medium while smaller particles move with it. By adjusting fluid velocity until drag equals mass force at the desired cut-off point, separation can be accomplished theoretically at any desired size. Most prior classifiers use air as the working fluid to develop the drag force but water and other liquids have also been used particularly for heavy particles such as those found in certain ore.

Earlier designs such as disclosed in Sturtevant Patent No. 1,384,929, employed gravitation to develop the mass force and a rising air flow to create the opposing drag force. However, for fine particles the required air velocity is so low that secondary flow phenomena, for example convection currents, become dominant and the accuracy of the process becomes completely unsatisfactory for modern industrial use.

In recognition of the deficiencies of the early process later designs were developed which employ centrifugal mass forces and a spiralling centripetal work medium flow to generate the drag force. The tangential component of the spiralling flow may either have essentially constant angular velocity as in U.S. Patent 2,338,779 or may exist in the form of free vortex flow as in U.S. Patents 2,753,-996 and 2,796,173.

The variations in these three designs alone indicate the enormous number of design parameters involved, which in turn explain why the prior art is voluminous while few designs are practical and none is completely satisfactory.

With these considerations in mind, it is the principal purpose and object of the present invention to provide improved classifiers which operate with an accuracy, efficiency and convenience not attainable with the previously known devices.

It is a further object of the present invention to provide a classifier of novel construction having for the first time in the art all of the following features and advantages:

(1) The particles to be classified are fed into the device through an open feed funnel thus eliminating the pressure feed or valving requirements associated with many prior designs.

(2) The classifier is self-contained thus eliminating the need for auxiliary fans or collectors.

(3) The classifier is controllable while running and provision is made for a wide control range, for example 1:15 with repeatable settings.

(4) The classifier achieves a classification of high accuracy and minimum carry over so that the sum of the oversize particles in the fines and the undersize particles in the coarse particle outlet is less than 10% of the total product.

(5) Particle discharge is "blow-free" thus permitting collection of the classified particles in open vessels and preventing contamination of the atmosphere in which the classifier operates.

(6) The classifier operates with high efficiency and high capacity for a given size with reduced power requirements.

(7) Operation of the classifier can be carried on either with liquid or with gas as the working medium in a closed circuit when desired over substantial ranges of temperatures and pressures.

(8) The classifier is not susceptible to clogging and is constructed to facilitate cleaning and replacement of the components on which the wear is concentrated.

In attaining these and other objects, the present invention provides a classifier in which the particles to be treated are fed into the central portion of a three-stage rotor. Particles are given a substantial radial velocity while being distributed in a uniform pattern circumferentially of the rotor. The particles are then fed into an annular classification zone, a portion of which is formed between stationary walls and the remainder of which is formed by walls of the second stage of the rotor. The work medium is driven by the first and third rotor stages, the first rotor stage moving the working medium toward the classification zone and the third rotor stage moving the working medium away from the classification zone entraining the fine particles.

The coarse particles move outwardly through the classification zone into an outlet scroll which preferably leads directly to a cyclone. The fine particles are conveyed to a fine outlet scroll for delivery to a second cyclone by the third rotor stage. After leaving the third rotor stage, the air passes through a cleaner and is returned to the first rotor stage so that the system operates with a closed fluid circuit.

Superimposed on the closed air circuit is a small ventilation air flow, the purpose of which is to remove the heat generated by friction and to provide a system for positively preventing clogging in certain close clearance spaces which are present in the classifier. The ventilation air is fed to pockets adjacent these clearance spaces to establish a flow of clean air into the main stream preventing particles from entering the clearances.

The construction and operation of the classifiers of the present invention and further objects and advantages of the invention will become apparent as the description proceeds in connection with the accompanying drawings in which:

FIGURE 1 is a front elevation of a classifier constructed in accordance with the present invention;

FIGURE 2 is a top plan view of the classifier of FIGURE 1;

FIGURE 3 is a central vertical half section of the classifier;

FIGURE 6 is an enlarged fragmentary section taken along line 6—6 of FIGURE 5;

FIGURE 7 is an enlarged fragmentary section taken along line 7—7 of FIGURE 3 illustrating details of one form of air cleaner structure;

FIGURE 8 is a view similar to FIGURE 7 showing a modified air cleaner; and

FIGURE 9 is a fragmentary half section of the upper portion of the classifier modified to utilize a liquid as the working medium.

Figure 4:
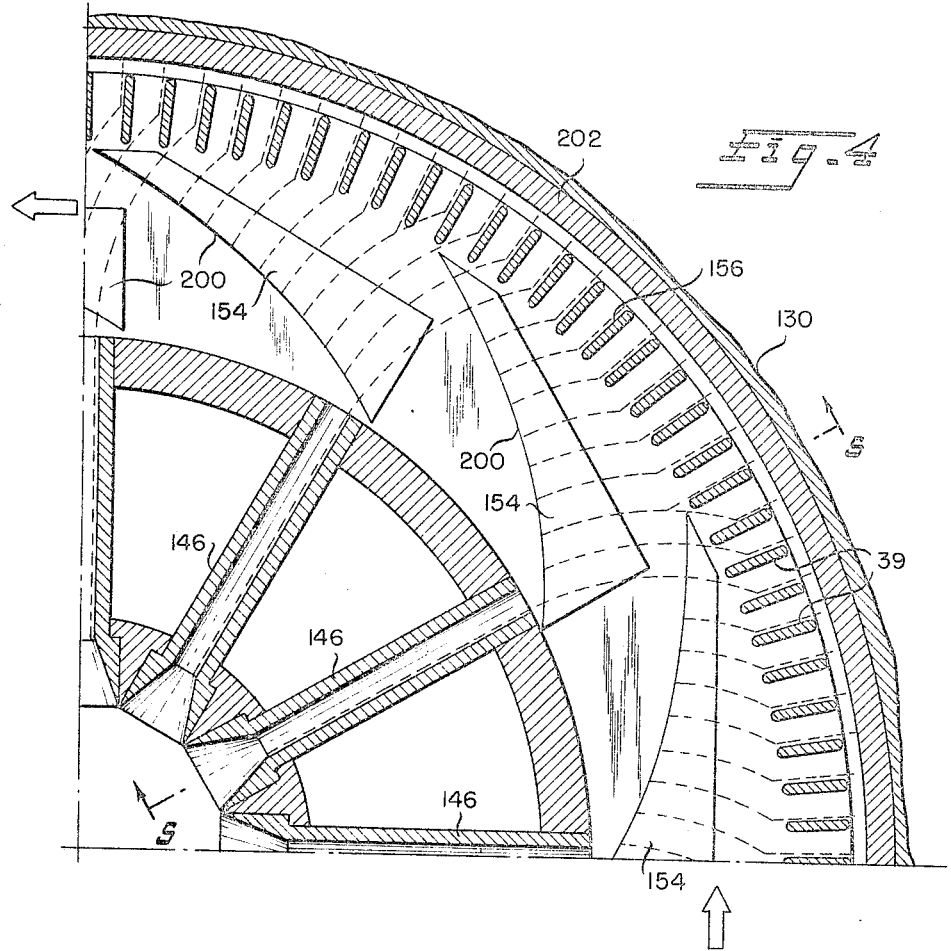
FIGURE 4 is an enlarged fragmentary section taken along line 4—4 of FIGURES 3 and 5 illustrating the portion of the rotor which feeds and distributes the particles to be treated.

Referring more particularly to the drawings, the classifier of the present invention is of generally cylindrical form and comprises a base section 20 containing the drive motor 22 (FIGURE 3) and the principal manual controls, the upper section 24 containing the classifier per se, the upper section being detachably secured to the base by a series of clamps 26.

As explained in detail below, the particles to be classified are fed into a hopper 28 mounted coaxially of the upper section 24 and the coarse particles are collected in an upper scroll 30 for delivery to a cyclone 32 and the fine particles are collected in a lower scroll 34 for delivery to a cyclone 36.

The base section 20 includes an annular housing member 38 provided with leveling feet 40 and having a top flange 42 to which the mounting flange 44 of motor 22 is secured by screws 46. The upwardly extending motor shaft 48 is connected by a coupling 50 to the rotor shaft 52 which extends upwardly through the apparatus coaxially of the upper section 24. The rotor shaft 52 is supported on upper and lower bearing assemblies 54 and 56 positioned by inner and outer annular sleeves 58 and 60, the outer races of the bearings being supported in a hollow cylindrical section 62 of an intermediate support member indicated generally at 64. The inner races of bearings 54 and 56 are clamped between lower retainer members 66 and 68 supported by a snap ring 70 on the rotor shaft and a cap member 72. The screw 74 clamps the rotor assembly indicated generally at 76 to the upper end of the rotor shaft 52. Suitable lubricant passages (not shown) are provided in the intermediate support member 64 to provide a continuous supply of lubricant to the bearings 54 and 56. The intermediate support assembly is provided with a conical section 78 which connects the central bearing support section 62 to an outer cylindrical flange 80, the lower edge of which rests on the flange 42 of the base section 20.

The upper housing portion 24 comprises a lower ring member 82 which rests on an annular flange 84 on the intermediate support member 64, an intermediate housing member 86 having an upwardly divergent wall portion 88 and an upper member indicated generally at 90 secured to the member 86 by screws 91.

Either the upper surface of the ring 82 or the lower adjacent surface of the intermediate member 86 is provided with a plurality of milled slots 92 so that when the parts are secured together as by screws 94 an annular outlet is formed leading into the interior of the lower scroll 34, which is clamped between flanges 96 and 98 on the respective members 82 and 86.

The outlet leading into the interior of the upper scroll 30 which is clamped between flanges 102 and 104 formed in the respective members 86 and 90 is formed between vanes 106 positioned between members 86 and 90. As shown in FIGURE 6, certain of the vanes receive the screws 91. The other vanes are provided with openings 107 in alignment with openings in the members 90 and 86 (not shown) to afford air passages as explained below.

A thin outer cover member 108 is secured to the upper housing member 90 by a plurality of screws 110 to form an annular air passage 112 for a purpose to appear.

The hopper 28 is threaded into plate 116, the outer periphery of which rests on a plurality of spaced bosses 118 in the upper housing member 90. An outer cover member 120 is clamped between the plate 116 and a flange on the hopper 28, the outer periphery of the member 120 forming with the member 108 a narrow annular air inlet opening 122 for a purpose to appear.

The upper portion of the rotor assembly 76 is closely surrounded by a plate 124 secured by screws 126 to the housing member 90; a plate 128; and a toroidal ring member 130 secured to the plate 124 by a plurality of screws 132. The plate 128 is spaced from the plate 124 by a plurality of vanes 134 formed integrally with the member 124 or the member 128 and the ring 130 is spaced from the plate 128 by a plurality of cylindrical collars 136.

It is a feature of the invention that all of the stationary structures above the flange 84 on the intermediate support member 64 can be lifted vertically from the remainder of the apparatus simply by disconnecting the latches 26 to expose the rotor for inspection, cleaning and repair.

The rotor assembly 76 includes a main rotor member 140 which is provided with a plurality of radial vanes 142 to provide a ventilation air blower and a plurality of straight radial vanes 144 which constitute the first blower stage and which drive the main air stream. The rotor assembly also carries a plurality, for example twelve to sixteen, particle feed tubes 146, the inner ends of which are in communication with the region at the bottom of the hopper 28 and the outer ends of which are in communication with a distributing chamber 148 formed between a portion of the main rotor member 140 and a secondary rotor member indicated generally at 150 which is secured to the main rotor member by a plurality of screws 152.

Cemented or otherwise secured to the secondary rotor member 150 within the distributing chamber 148 is a plurality of distributor baffles 154 which will be described in detail below. A plurality of drive blades 156 are set in milled recesses in the secondary rotor member 150 and are clamped between the main and secondary rotor members by screws 152. The secondary rotor member also carries alternate long and short straight radial vanes 158 and 160 (FIGURE 6), the latter extending around a U-shaped divider section 162 and extending radially outwardly therefrom to form the final stage rotor blade section 164.

Upon rotation of the rotor, air is caused to flow in a main air circuit as shown by the arrows 170 outwardly through vanes 144 around the divider 130 radially inwardly through the classification zone, the inner and outer boundaries of which are indicated approximately by the phantom lines I and O, outwardly through the final rotor stage 164 and then inwardly through the stationary separator 174 described in detail below, and upwardly over the conical section 78 of the intermediate support assembly 64 for passage between the feed tubes 146 and return to the first rotor stage.

The rotation of the vanes 142 also causes a flow of secondary air inwardly through the annular opening 122 through spaces (not shown) into the region adjacent the inner end of the rotor blades 142, hence outwardly through the diffusor vanes 134 and through openings 176 in the member 90, through the space 112, through the passage including the opening 107 (FIGURE 6) and into the space 178 between the inwardly extending lips 180 and 182 on the member 86. The ventilating air leaves the space 178 through narrow clearance spaces 184 and 186 formed between the inner ends of the lips 180 and 182 and the adjacent rotor portions. The flow of air through the clearance spaces 184 and 186 into the classification zone and the third rotor stage prevents the entry of particles into these clearances and thus prevents the high friction losses, wear and contamination and heat generation would otherwise develop. The ventilating air then joins the main air stream and a corresponding volume of air together with the air entering through the feed tubes exits from the device into the scrolls 30 and 34. A portion of the ventilating air also flows around the top of plate 124 through openings 188 and 190 in the member 90 and passes through the narrow clearance space 192 formed between the inner portions of the rotor assembly 76 and a downwardly projecting flange 193 on the member 90 adjacent the inlet of the feed tubes 146. A portion of the air also passes through drilled rotor passages 194 and 195 and through the clearance space 196 between the rotor and the top of boss 12 to protect the rotor shaft from contamination.

The particles to be classified are fed at a uniform rate into the hopper on the upper part of the housing, the slight vacuum existing at the bottom of the hopper assisting in the movement of the particles into and through the feed tubes 146.

Figure 5:
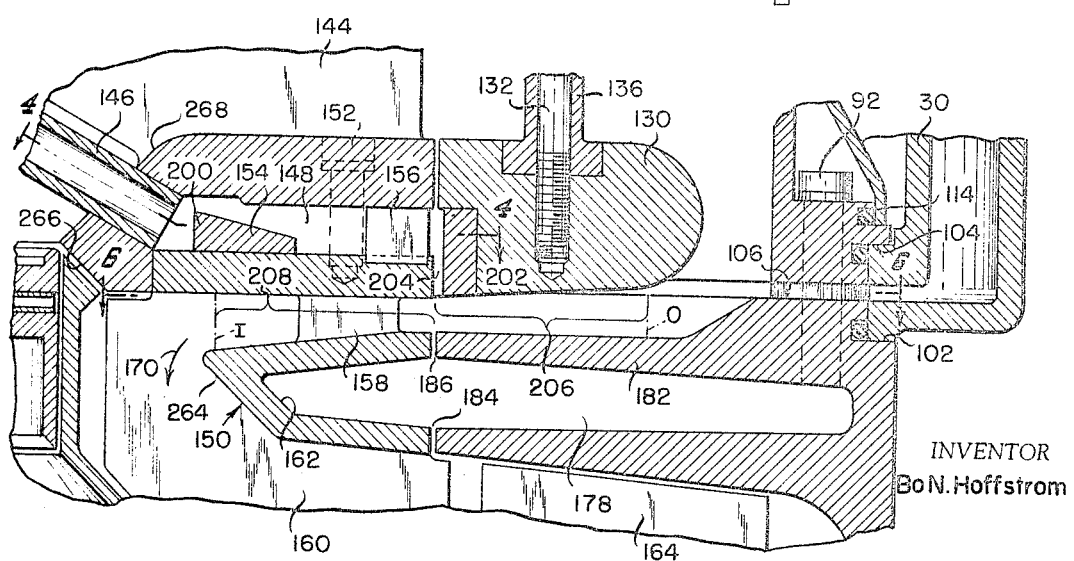
FIGURE 5 is an enlarged fragmentary section taken along line 5—5 of FIGURE 4.

The particles pass outwardly into the chamber 148 where they are intercepted by the distributor baffles 154. As shown in FIGURES 4 and 5 the baffles are provided with an inclined curved surface 200 which extends from the area opposite the end of each of the feed tubes 146 outwardly in the direction of rotation of the rotor and terminates at a point closely adjacent to the inner edge of the drive blades 156. The surface 200 is ideally formed as a part of the logarithmic spiral with an angle to the circle of about 30° to 40°. In practice a circle of constant radius is substituted for the spiral. The surface 200 is parallel with the rotor axis as shown in FIGURE 5. The surface 200 is of constantly decreasing height in the direction away from the outlet of the feed tubes. The unique configuration, position, and dimensioning of the baffles 154 are such that a substantially completely uniform distribution of the particles as they are delivered to the inner edges of the drive blades 156 is effected. The particles then pass outwardly through the spaces between the drive blades 156 and are delivered to the inner surface of a cylindrical stop-ring 202 which is suitably secured to the divider member 130. The stop-ring is in the form of a separate strip to facilitate replacement of the stop-ring since the stop-ring is exposed to relatively great wear. After contact with the stop-ring 202 the particles pass vertically down through the slot 204 formed between the lower edge of the stop-ring and the outer edge of the rotor assembly directly into the center of the classification zone. Since the stop-ring 202 is cylindrical or only slightly tapered, the radial particle velocity when entering the classification zone is zero. This is possible only when the stop-ring is stationary, as in the subject apparatus. A stop-ring revolving with the rotor must have a slant wall above the friction angle for the feed material on the surface in question or generally in the order of 45°. Since there must be a margin between actual friction angle and the stop-ring surface inclination, particles will slide along this surface with considerable velocity under the influence of the centrifugal field, and will have a considerable radial velocity component when they enter the classification zone which materially complicates the subsequent classification of the particles.

As best shown in FIGURE 5, the classification zone comprises an outer stationary annular zone 206 formed between the lower wall of the member 130 and the upper wall of the lip 182 and an inner rotating annular zone 208, the latter containing the blades 158 and 160.

The radial blades in the inner classification zone 208 reduce peak air velocity and thus reduce losses due to friction. In the absence of these blades free-vortex flow would occur in this region. Since the radius in this region is about two-thirds the radius of the tips of the blades 158, air velocity would be 50% higher and losses in this part of the main air stream would be more than twice those experienced in the apparatus of the present invention employing the blades. The blades also permit a sturdy one-piece rotor construction and produce a desirable boundary layer flow as explained in detail below.

In the outer annulus 206 the air flow is in a free vortex pattern where $vr$ is constant, $v$ being the tangential velocity and $r$ the corresponding radius. In the inner classification zone 208, the air revolves with the rotor at constant angular velocity and the ratio $v/r$ is constant. In order to provide equilibrium for a cut-off size particle anywhere in the entire outer classification zone 206, the walls of this zone must converge with reduced radius. No single shape of the outer classification zone will fulfill the exact requirement for equilibrium for more than a single Reynolds number, which may vary rather widely depending on the nature of the particles involved and the working fluid associated with the particles. For example, classifiers using air as the working medium will normally operate at Reynolds numbers in the ranges from 10 to 100. Classifiers using water will normally operate at Reynolds numbers above 1,000.

Often in prior constructions the fact that Reynolds numbers in most applications are well above those associated with Stoke's region (laminar flow) and that they in many cases are within Newton's region (turbulent flow) has been overlooked. Most prior units have failed to recognize the Stoke's equations as valid only in a unit gravity field, but not in a centrifugal field of 100 to 1,000 g's as may be encountered in the subject apparatus.

To fulfill the equilibrium conditions in the inner classification zone 208, the walls must diverge with reduced radius. In each case the difference between the theoretically perfect zone shapes for various Reynolds numbers dictate the use of a compromise configuration. Ideally, the wall of both classification zones should be curved. However it has been discovered that the slight curvature may be dispensed with and the walls of the zones may be made with straight generatrices without sacrifice of obtainable classification accuracy. To further simplify manufacturing, it is completely satisfactory to make one wall of the classification zone flat and the other conical, and this construction has been adopted in the unit of the present invention. Specifically, the lower wall of the member 130 is conical and the opposite wall of the lip 182 is flat. Conversely the upper wall of the inner classification zone is flat while the lower wall is conical.

The basic height of the classification zone should be within the range of 0.05 to 0.25 of the radius of the tips of the blades 158. Accuracy of the classification improves with reduction in zone height. However reduction in zone height is also accompanied by a reduction in feed capacity.

In order to accommodate the air which enters the classification zone with the feed and through the clearance space 186 and for the space taken up by the blades 158 and 160 the basic zone height for the inner zone 208 must be increased somewhat. For example, in a typical case the zone height for the inner classification zone 208 should be in the neighborhood of 1.12 times the corresponding height for the outer classification zone 206.

Any particle above cut-off size moves radially out of the classification zone against the air stream through the spaces between vanes 106 into the coarse collection scroll 30. Finer particles follow the main air flow inwardly around the divider member 150 and outwardly through blades 164 and into the space bounded by the tapered wall 88.

It is important to remove the fine particles from the internal air stream before the stream returns to the region of the rotor blades 144. If they are not removed, some of these fine particles will pass out into the scroll 30 together with the coarse particles before they reach the classification zone the second time. Accordingly, before the air stream is returned to the region of the vanes 144, it is passed through the grid separator assembly 174 which is preferably of the form shown in copending application Ser. No. 31,402 now Patent No. 3,140,937 filed May 24, 1960 for Separators. Briefly, this form of separator includes a plurality of identical rods 210 (FIGURE 7) arranged in a form of a circular grid. In the present instance these rods are clamped between a lower plate 212 carried by the mounting member 64 and an upper plate 214 secured to the member 64 by a plurality of screws 216. It will be noted that the member 214 also forms the upper wall of the channel connecting the downstream side of the separator assembly 174 and the inlet side of the main rotor blades 144. The rods are mounted in a suitably spaced relation to provide throats 218 between them. The rods are also each provided with a central axially extending opening 220 in communication with the exterior of the rods through entrance slots 222.

As explained more fully in the aforesaid application Ser. No. 31,402, as the particle laden air passes circumferentially around the outer surface of the rods in the direction of the arrows 224, the larger particles in the air stream travel in a downward spiral path around the outer surface of the grid and finally leave the bottom edge of the grid. The air passing through the throats 218 is substantially free of particles. In the present case, both the relatively larger particles, travelling around the outer surface of the grid and the somewhat smaller particles passing down through the openings 220 are delivered to the conical wall portion 78 of the member 64 for passage through the slot 92 to the fines collector scroll 34.

FIGURE 8 shows another form of grid separator which is somewhat less susceptible to clogging and which may be used for any material. The individual grid elements 226 are slightly larger than the elements 210 and the exit throats 228 are also of increased size. For this reason the separator of FIGURE 8 is less effective than the separator of the aforesaid application 31,402. However, it is satisfactory for use in the classifier of the present invention and removes 80% to 99% of the fines from the recirculating air depending upon particle size and other factors. Of the remaining 1% to 20% of the fines, only a small fraction follows the coarse fraction and in most cases it is possible to reach the goal of less than 10% for the sum of the undersized particles in the coarse outlet and oversize particles in the fines outlet.

It is a feature of the present invention that the particle cut-off size may be controlled within a wide range while the apparatus is in operation. The control is achieved by a throttle ring 230 which is movable between a full open position as shown in the full lines in FIGURE 3 and a full closed position. Shown in the dotted lines is a partially closed position. As the throttle ring 230 moves downwardly toward the dotted line position, it cuts off an increasing amount of the main air flow. This reduces the radial velocity of the air in the classification zone without effecting the tangential velocity of the air. The effect is a reduction in the particle size cut-off.

The throttle ring 230 is mounted on three stems 232 (one shown) slidably mounted in collars 234 carried by the member 64. The lower ends of these stems are threaded into sleeves 236 rotatably supported by bosses 238 in a ring assembly 240 suitably secured by inner and outer sets of screws 242 and 244 to the intermediate support member 64. At its lower end one of the sleeves 236 carries a gear 246 meshing with a gear 248 mounted for rotation with a sleeve 250 rotatably supported on a pin 252 carried by a boss 254 in the intermediate support member 64.

Also secured to the sleeve 250 is a control ring 256, the periphery of which projects through an opening in the housing to permit manual adjustment.

An indicator dial 258 carrying suitable indicia is mounted for free rotation on sleeve 250 together with gear 260 which meshes with a small gear 262 rotatable with sleeve 236. Thus when the setting is changed by operation of the control ring 256, the dial 258 is also rotated but at a reduced speed.

The parts are so proportioned that several turns of the control ring 256 produce full movement of the throttle while the dial 258 moves 360° thus allowing a single scale to cover the entire operating range.

The ring 256 may be adjusted at any time during the operation of the machine and provides for a variation in particle cut-off size of 1:15 or more.

The accuracy of the classification effected by the apparatus of the present invention is achieved because of the following facts in addition to certain of the factors discussed above.

First, the tangential air velocity and the angular velocity of the tips of blades 158 and 160 in the classification zone is carefully matched. This is accomplished by making the tip diameter of blades 144 sufficiently larger than the tip diameter of the blades 158 and 160 as to compensate for air velocity loss due to friction from the exit of the blades 144 to the entrance of the blades 158 and 160. This relationship is a function of the dimensions of the parts and once the correct dimensional relationships are established the correct velocity reatlionship is obtained regardless of variations in rotor r.p.m. Accordingly, accurate speed control of the apparatus is not necessary.

Similarly, the tip diameter of the feed drive blades 156 is made large enough to compensate for the friction against the feed stop-ring 202. The wear pattern of the blades 158 and 160 clearly indicates whether or not feed velocity is correct. The free particle motion in the classification zone follows the same law of $vr$ constant as the fluid in the free vortex. Particles should strike the back sides of the blades starting just inside the tips.

Although the relative velocity difference is small, these impacts help de-agglomerate the particles and enhance classification sharpness. Once a particle of cut-off size or smaller has struck the blade its tangential velocity is reduced slightly and it cannot pass through the outer zone 206 with its free vortex flow even if it should receive a slight radial outward velocity from collision with another particle. A slightly larger particle that might have entered the inner annulus 208 and struck the back side of a blade would still penetrate the outer annulus and reach the coarse outlet because of its larger mass force.

As mentioned above, the cylindrical configuration of the stop-ring 202 assures the entry of the particles into the classification zone with zero radial velocity thus insuring accuracy of the classification and greatly simplifying the construction of the classification zone.

The fact that the stop-ring and its supporting structure, the ring 130, is stationary is also of importance since it effects boundary layer control to eliminate "leakage" of particles through the boundary layers into the wrong fraction. Since the ring 130 and the lip 182 form the outer classification zone 206 and are stationary, the fluid within this zone revolves in a free vortex in which the pressure decreases toward its center. Thus the boundary layers on the stationary walls of the outer classification zone will flow toward the center of the zone.

If these walls revolved with the same angular velocity as the air in the feed slot 204, they would have higher velocity than the air at all other points and the boundary layer flow direction would be reversed, i.e. it would proceed radially outwardly.

The walls of the inner classification zone 208 have the same tangential velocity as the air, and since the required increase in zone height here is large enough to increase the total flow area with decreased radius, a slight diffusion takes place. Therefore the boundary layer on these walls will travel radially outwardly toward the feed slot 204.

Accordingly, particles caught in the boundary layers (in which the classification equilibrium cannot be maintained) are transported from both the outer and inner zones 206 and 208 toward the middle of the classification zone opposite the feed slot 204. There the particles are returned to the main air stream by the ventilation air flowing through the feed slot 204 and the clearance space 186. When they are returned to the main stream they will again be subjected to the proper classification forces and will eventually be collected in the fines or coarse scrolls, depending upon their size.

Classification accuracy is also substantially improved by the delivery of the feed particles in a substantially uniform annular curtain into the classification zone, because of the employment of the distribution baffles 154. In the absence of such baffles, the feed tubes 146 would produce discrete streams of particles which slow down the radial air velocity in the classification zone where they appear while the air in the regions between the feed streams would be accelerated due to the increase in pressure drop caused by the particle stream. It is apparent from this condition that it reduces classification accuracy as compared with the uniform feed distribution achieved with the present invention.

It will be noted that the apparatus of the present invention is so constructed as to avoid in all areas any particle build-up which leads to clogging, loss of efficiency, or loss of accuracy and cleaning problems. The stationary surfaces exposed to the main air stream are swept clean by the air passing over them. All revolving surfaces facing the rotor axis are inclined with respect to the axis or to the radius at an angle smaller than 45°. Thus the effected rotor surfaces 264, 266 and 268 are all conical and have a slope of approximately 30°–40° with respect to the rotor axis.

The feed-out slots leading to the scrolls 30 and 34 are interrupted only by "islands" large enough to receive the necessary screws for assembly and in the case of the scroll 30 the drilled passages for the barrier or ventilation air flow. To facilitate the free passage of the air and the entrained particles into the scrolls 30 and 34, the vanes or lands which extend across the opening are streamlined and are set at an angle that coincides with the air velocity vector entering the slot.

The free flow of the air is also facilitated by the configuration of the scrolls 30 and 34 which are each of gradually increased total cross section area. This serves to keep the air velocity in them constant at constant flow through all parts of the slots 92 and 100. Through the system, air velocity is maintained well above the minimum required.

To separate the particles from the ventilating air before their ultimate delivery the cyclones 32 and 36 are provided with downwardly directed particle delivery spouts 270. The cleaners are so designed that the pressure at the spouts is atmospheric and no blowing occurs even when open vessels are used to receive the coarse and fine fractions. The clean air is discharged through large top openings.

For small size units the discharge cyclones are effective in most cases. However for larger units it is preferable to use grid separators of the type shown in FIGURE 7. In some cases neither cyclone cleaners nor grid separators are sufficiently effective. In such cases, bag filters or other equally efficient cleaners may be connected to the air outlets of the cyclones.

Although there are few residual particles left in the apparatus of the present invention after a run, it is sometimes necessary to clean it completely before the next run. For this purpose a discharge cyclone is easily removable since they are held in place only by spring clips 271. As pointed out above, the entire upper housing portion of the apparatus of the present invention can be lifted off by release of the latches 26, thus exposing the rotor and the grid separator for cleaning as well as to permit free access to the interior of the housing.

For operation with liquid instead of gas as the working medium, the top cover 120 is removed and replaced by a receptacle 272 for the liquid shown in FIGURE 9. The liquid must be continuously replenished to make up the quantity lost through the discharge cyclones. If the discharged liquid is sufficiently cleaned, it will be re-circulated. Otherwise fresh liquid is supplied to maintain a fluid level as indicated by the reference line 274 in FIGURE 9. Suitable supply and overflow pipes 276 and 278 respectively may be supplied.

Openings 280 in the hopper permit sufficient liquid to enter the hopper to suspend the feed and propel it to the classification zone. If a suspension is already available, it can be fed into the funnel at a rate which is limited by the pressure over the openings 280 which must always be such as to promote flow into the hopper. For this purpose, the fluid within the funnel or hopper must be kept below the level of the fluid outside of the hopper.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for classifying mixed fine and coarse particles and delivering said fine and coarse particles separately, comprising a pair of opposed walls providing an annular classification zone having an annular open outer boundary and an annular open inner boundary, the spacing between said walls being progressively decreased inwardly from the said outer boundary of said zone to the central region of said zone, and the spacing of said walls being progressively increased from said central regon toward said inner boundary of said zone, means for rotating at least the portion of said walls inwardly of said central region at the same speed, means for causing a working fluid to flow inwardly through said zone, said fluid following a free vortex path from said outer boundary to said central region of said zone, flow directing means in said zone for causing said fluid to flow from said central region to said inner boundary of said zone with constant angular velocity, means for delivering a stream of said mixed particles through one of said walls into said central region with substantially zero radial velocity and with substantial angular velocity, said coarse particles being carried by centrifugal force toward an outlet at the outer boundary of said zone and said fine particles being carried by said fluid through and past the inner boundary of said zone to a separate outlet.

2. The apparatus according to claim 1, together with passage means connecting the inner boundary of said zone with the outer boundary of said zone to provide a flow of recirculating working fluid, and a separator in said passage means for removing particles entrained in said fluid before said fluid is returned to said classification zone.

3. The combination according to claim 1 wherein said means for moving said working fluid through said classification zone comprises a three stage rotor, the first stage of said rotor containing blades for moving fluid toward the outer periphery of said zone, the second stage of said rotor containing said flow directing means within said zone and the third stage of said rotor containing blades for moving fluid away from the inner boundary of said zone.

4. Apparatus according to claim 1 together with throttle assembly means for regulating the volumetric rate at which said working fluid flows through said zone to thereby vary the radial velocity of said fluid while maintaining said constant angular velocity.

5. In a classifier in which particles are classified in an annular classification zone having an open annular outer boundary and an open annular inner boundary through which a fluid medium is passed from said outer boundary thereof to said inner boundary thereof: means for delivering said particles to said classification zone comprising means forming a distributing chamber, a plurality of radial feed channels leading to the inner boundary of said distributing chamber, means for rotating said feed channels and said chamber whereby particles are moved through said feed channels into said chamber by centrifugal force, baffles in said chamber opposite the outlets of each of said feed channels, said baffles having guide surfaces extending from the region opposite the outlet end of one of said feed tubes to the region opposite the outlet end of the next adjacent feed tube, said baffles intercepting said particles and delivering them to the outer boundary of said chamber, a plurality of blades adjacent the outer boundary of said distributing chamber, said baffles and said blades co-operating to produce a substantially uniform particle flow to all portions of the boundary of said chamber, and a stationary target positioned around the boundary of said chamber against which particles are thrown by centrifugal force, said particles passing from the edge of said target into said classification zone.

6. Apparatus for classifying mixed coarse and fine particles and delivering said coarse and fine particles separately, comprising a housing, a rotor assembly mounted for rotation co-axially of said housing, a pair of opposed stationary walls rigid with said housing providing an outer portion of an annular classification zone having an open annular outer boundary, the spacing between said stationary walls being progressively decreased inwardly from the outer boundary of said zone to the central region of said zone, a pair of opposed rotating walls rigid with said rotor assembly forming the inner portion of said annular classification zone, and providing an open annular inner boundary for said classification zone, the spacing between said rotating walls being progressively increased from said central region toward the inner boundary of said zone means carried by said rotor for causing a working fluid to flow inwardly through said zone from the outer boundary thereof toward the inner boundary, said fluid following a free-vortex path in the region between said stationary walls, flow directing means carried by said rotor and positioned between said rotating walls for causing said fluid to flow from said central region to said inner boundary of said zone with substantially constant angular velocity, means for delivering an annular curtain of mixed particles into said classification zone between the inner periphery of said stationary walls and the outer periphery of said rotating walls wtih substantially zero radial velocity and substantial angular velocity, said coarse particles being carried by centrifugal force toward an outlet at the outer boundary of said zone, and said fine particles being carried by said fluid through and past the inner boundary of said zone to a separate outlet.

7. The apparatus according to claim 6 together with passage means in said housing and said rotor, connecting the inner boundary of said zone with the outer boundary of said zone to provide a path for recirculating said working fluid, and a separator carried by said housing and interposed in said passage means for removing fine particles entrained in said fluid before said fluid is returned to said classification zone.

8. The combination according to claim 6 wherein said means carried by said rotor for moving said working fluid through said classification zone comprises a set of blades for moving said fluid toward the outer boundary of said classification zone and a second set of blades for moving said fluid away from the inner boundary of said zone.

9. The apparatus according to claim 6 wherein said means for delivering said particles to said classification zone comprises means forming an annular distributing chamber in said rotor, a plurality of radial feed tubes carried by said rotor leading to the inner portion of said distributing chamber, a stationary hopper carried by said housing communicating at its lower end with the inner end of said radial feed tubes whereby when said rotor is rotated, particles are moved through said feed tubes from said hopper into said distributing chamber by centrifugal force, a plurality of blades adjacent the outer periphery of said distributing chamber, baffles in said chamber opposite the outlets of said feed tubes inwardly of said blades, said baffles and said blades intercepting said particles and delivering them substantially uniformly to all portions of the outer periphery of said chamber, and a stationary essentially vertical target carried by said housing in surrounding relation to the outer periphery of said distributing chamber against which particles are thrown by centrifugal force, said particles being gravity-urged from the lower edge of said target into said classification zone.

10. The apparatus according to claim 6 together with throttle assembly means for regulating the volumetric rate at which said working fluid flows through said zone to thereby vary the radial velocity of said fluid while maintaining said constant angular velocity.

11. The combination according to claim 6, at least one of said rotary walls being separated from the adjacent stationary wall by a clearance space, and pump means for moving a stream of fluid through said clearance space into said classification zone to maintain said clearance space free of particles.

12. Apparatus for classifying mixed fine and coarse particles and delivering said fine and coarse particles separately comprising a pair of opposed walls providing an annular classification zone having annular open inner and outer boundaries, the spacing between said walls being progressively decreased inwardly from the outer boundary of said zone to the central region of said zone and being progressively increased from said central region to the inner boundary of said zone means for rotating at least the portion of said walls inwardly of said central region at the same speed, means for causing working fluid to flow inwardly through said zone in a spiral path, means for delivering an annular stream of said mixed particles through one of said walls into the central region of said zone, said coarse particles being carried by centrifugal force toward an outlet at the outer boundary of said zone, and said fine particles being carried through and past the inner boundary of said zone to a separate outlet, passage means connecting the inner boundary of said zone with the outer boundary of said zone providing a path for recirculating said working fluid, a throttle assembly movably positioned in said passage means and means operable from the exterior of said classifier for moving said throttle assembly to change the effective size of said passage means to regulate the volumetric rate of flow of said fluid medium to thereby vary the radial velocity by which said fluid medium passes through said classification zone.

13. The apparatus according to claim 6 wherein said rotor assembly and said housing are separated by annular clearance spaces together with pump means for moving a stream of fluid through said clearance spaces into said classification zone to maintain said clearance spaces free of particles.

14. Apparatus for classifying mixed coarse and fine particles and delivering said coarse and fine particles separately, comprising a housing, a rotor assembly mounted for rotation co-axially of said housing, a pair of opposed stationary walls rigid with said housing providing an outer portion of an annular classification zone having an open annular outer boundary, the spacing between said stationary walls being progressively decreased inwardly from the outer boundary of said zone to the central region of said zone, a pair of opposed rotating walls rigid with said rotor assembly forming the inner portion of said annular classification zone and providing an open annular inner boundary for said classification zone, the spacing between said rotating walls being progressively increased from said central region toward the inner boundary of said zone, a first set of vanes carried by said rotor for causing a working fluid to flow inwardly through said zone from the outer boundary thereof toward the inner boundary, the outer ends of said vanes being disposed inwardly of the outer boundary of said classification zone, said fluid following a free-vortex path in the region between said stationary walls, a second set of vanes carried by said rotor and positioned between said rotating walls for causing said fluid to flow from said central region to said inner boundary of said zone with substantially constant angular velocity, the outer ends of said second set of vanes being disposed inwardly of the outer ends of said first set of vanes, means for delivering an annular curtain of mixed particles into said classification zone between the inner periphery of said stationary walls and the outer periphery of said rotating walls with substantially zero radial velocity and substantial angular velocity, said coarse particles being carried by centrifugal force toward an outlet at the outer boundary of said zone, and said fine particles being carried by said fluid through and past the inner boundary of said zone to a separate outlet.

15. Apparatus according to claim 14 wherein said means for delivering an annular curtain of mixed particles comprises means on said housing forming an annular, stationary target adjacent said central region of said classification zone, the axis of said annular target being essentially parallel to the axis of said rotor assembly, and means carried by said rotor assembly for projecting said particles radially outward for impingement against said annular target.

16. The apparatus according to claim 14 together with throttle assembly means for regulating the volumetric rate at which said working fluid flows through said zone to thereby vary the radial velocity of said fluid while maintaining said constant angular velocity of said fluid.

References Cited
UNITED STATES PATENTS

| | | | |
|---|---|---|---|
| 2,055,485 | 9/1936 | Fraser | 209—148 |
| 2,114,780 | 4/1938 | Juelson | 230—133 X |
| 2,169,680 | 8/1939 | Crites | 209—144 |
| 2,497,088 | 2/1950 | Lykken | 209—144 |
| 2,546,068 | 3/1951 | Gustavsson | 209—144 X |
| 2,616,563 | 11/1952 | Hebb | 209—211 |
| 2,701,642 | 2/1955 | Goodwin | 209—211 |
| 2,702,630 | 2/1955 | Scott | 209—133 |
| 2,753,996 | 7/1956 | Kaiser | 209—144 |
| 2,774,476 | 12/1956 | Doyle | 209—144 |
| 2,796,173 | 6/1957 | Payne | 209—144 |
| 2,943,734 | 7/1960 | Payne | 209—144 |
| 2,943,735 | 7/1960 | Payne | 209—144 |
| 2,973,896 | 3/1961 | Peltzer | 233—19 |
| 2,990,063 | 6/1961 | Elias | 209—144 |
| 3,015,391 | 1/1962 | Sharples | 209—144 |
| 3,048,271 | 8/1962 | Sharples | 209—144 |
| 3,057,475 | 10/1962 | Matthews | 209—144 |
| 3,237,766 | 3/1966 | Humphreys | 209—144 X |

FOREIGN PATENTS 220,069  4/1958  Australia.

HARRY B. THORNTON, *Primary Examiner.*

R. HALPER, *Assistant Examiner.*